United States Patent [19]
Tillis

[11] 3,923,290
[45] Dec. 2, 1975

[54] SHEAR CONTROL FOR EXTRUDER APPARATUS

[76] Inventor: Robert Tillis, 51 Harmon Road, Edison, N.J. 08817

[22] Filed: May 7, 1974

[21] Appl. No.: 467,807

[52] U.S. Cl. .................................. 259/191; 403/2
[51] Int. Cl.² ........................................ B29B 1/06
[58] Field of Search ......... 259/191, 192, 193, 9, 10, 259/97, 25, 26; 74/405, 411.5, 2; 64/28 R; 403/2; 425/207, 208, 209

[56] References Cited
UNITED STATES PATENTS

| | | | |
|---|---|---|---|
| 1,262,530 | 4/1918 | Lowe | 64/28 R |
| 1,776,525 | 11/1929 | Talbot | 64/28 R |
| 2,288,425 | 6/1942 | Simborg | 64/28 R |
| 3,000,577 | 9/1961 | Ferguson | 64/28 |
| 3,126,723 | 3/1964 | Dugay | 64/28 |
| 3,375,549 | 4/1968 | Geyer | 259/192 |
| 3,683,713 | 8/1972 | Brucher | 64/28 R |
| 3,753,625 | 8/1973 | Fabrizio | 64/28 R |

Primary Examiner—Robert W. Jenkins
Attorney, Agent, or Firm—Robert H. Epstein

[57] ABSTRACT

Apparatus for extruding plastic material includes a barrel having a screw disposed therein and rotatable to force the plastic material from an inlet to an outlet, the barrel being rotated via a motor driving a reducer having an output member driven at a speed less than the speed of the motor and a shear control device coupling the output member of the reducer with the screw and operative to interrupt rotation of the screw when the shear force between the screw and the output of the reducer exceeds a predetermined value less than the shear force required to break the screw. In one embodiment, the shear control device includes a coupling shaft having a portion of reduced cross-sectional area less than the cross-sectional area at any point along the screw such that the coupling shaft will break to interrupt the drive to the screw before a sufficient force is generated to break the screw.

9 Claims, 2 Drawing Figures

SHEAR CONTROL FOR EXTRUDER APPARATUS

BACKGROUND OF THE INVENTION

1. Field of the Invention

The present invention pertains to extruder apparatus and, more particularly, to preventing breakage of the screw of such extruder apparatus by shear forces.

2. Discussion of the prior art

Apparatus for extruding plastic material conventionally includes an elongated screw extending within a barrel and rotatable to force plastic material fed to the barrel at an inlet through a suitable die at an outlet of the barrel to produce a product of desired cross-sectional configuration. The screw normally has a shank directly driven by a drive output member of a gear reducer which converts the high speed, low torque output of an electric motor to low speed, high torque drive for the screw. As the plastic material is extruded, the viscosity of the material frequently retards movement of the screw to such an extent that the shear force between the drive output member and the screw is sufficient to snap or break the screw thereby requiring that the apparatus be shut down while the broken screw is removed from the apparatus and a new screw substituted therefor. This procedure is expensive, not only due to the high cost of the screws, but also due to the down-time of the apparatus.

In order to overcome the problem of breaking extruder screws, it has become the practice to utilize overload clutches and couplings, torque limiters, shear pins, current limiters, electric overload switches and the like at the high speed, low torque side of the reducer such that when a shear force exists, the devices will de-couple the drive for the screw to prevent breaking of the screw. The devices utilized on the high speed, low torque side of the reducer take many forms and are normally operable by electrical, mechanical, magnetic, hydraulic, pneumatic or spring actuated means; however, since these devices operate essentially on the output from the motor, rather than at the low speed, high torque side of the reducer, such devices have been subject to many disadvantages. For instance, the current limiters and electric overload switches react too slowly under peak torque conditions and are not effective to protect the screws against inertial loads. When shear pins or springs are utilized, they must necessarily be small; and, thus, any dimensional variations in their manufacture or assembly have a much greater effect on the variations in output torque at the drive output member of the reducer and, further, the smaller units are more subject to fatigue failure. When friction-operated devices such as clutches or torque limiters are utilized, the friction faces will vary with face-wear and conditions such as temperature, humidity, dust and the like; and, since such conditions often vary in the normal operating environment for extruders, such friction-operated devices are not dependable. Electric and magnetic units are adversely affected by supply voltage variations, while hydraulic and pneumatic units are adversely affected by dirt in the fluid systems and variations in pressure and relief valve reaction time.

In general, shear control devices utilized on the high speed, low torque side of the gear reducer all suffer from "manufacturing tolerances," since they are operating on the low torque side of the drive while the torque is essentially increased by the ratio of the speed reducer which can be in the order of 15:1 to 80:1. Thus, the manufacturing tolerances are greatly amplified by the gear reducer and permit unsuitable variations in the shear forces allowable between the output member and the screw causing frequent breaking of screws even with the use of the shear control devices. Attempts to lower the value of shear force at which the drive is interrupted have not been successful in that the pressure built up by the plastic material being forced through the barrel frequently increases to a high level while it is desirable to continue operation, even at such high levels, rather than shutting down the apparatus to remedy the problem. Accordingly, reducing the level of shear force at which drive interruption occurs disadvantageously increases down-time of the apparatus.

SUMMARY OF THE INVENTION

The present invention is generally summarized in apparatus for extruding material including a barrel having an inlet for receiving material to be extruded and an outlet for exit of the material, a screw disposed in the barrel, a drive assembly including a motor and a reducer coupled with and rotatably driven by the motor and having an output member driven at a speed less than the speed of the motor, and shear control means coupling the output member of the reducer with the screw to rotate the screw to force the material to be extruded from the inlet to the outlet of the barrel, the shear control means being operative to interrupt rotation of the screw when the shear force between the screw and the output member of the reducer exceeds a predetermined value less than the shear force required to break the screw.

Accordingly, it is a basic object of the invention to overcome the above-mentioned disadvantages of the prior art by utilizing shear control devices at the low speed, high torque output of a reducer to prevent breaking of the screw of extruder apparatus.

Another object of the present invention is to prevent the breaking of a screw of extruder apparatus by utilizing a coupling shaft to drive the screw, the coupling shaft having a portion of reduced cross-sectional area such that the coupling shaft will break if the shear force between the drive and the screw exceeds a predetermined value less than the shear force required to break the screw.

The present invention has a further object in that extruder apparatus has a shear control device coupling the output of a gear reducer to a screw such that the shear force under which the shear control device operates represents the true shear force between the reducer output and the screw.

An additional object of the present invention is to provide a coupling shaft for extruder apparatus made of a material and configured to break under a shear force before the screw of the extruder apparatus will break.

Some of the advantages of the present invention over the prior art are that manufacturing tolerances are increased due to the shear control device being subject to the shear force at the output of the reducer, the coupling shaft will break before the screw and is simple and inexpensive to replace, variations in supply voltage, pressure, reaction time, dimensional characteristics and fatigue are not as crucial to the shear control device, and shear control can be simply and inexpensively implemented.

Other objects and advantages of the present invention will become apparent from the following descrip-

DESCRIPTION OF THE PREFERRED EMBODIMENTS

Figure 1:
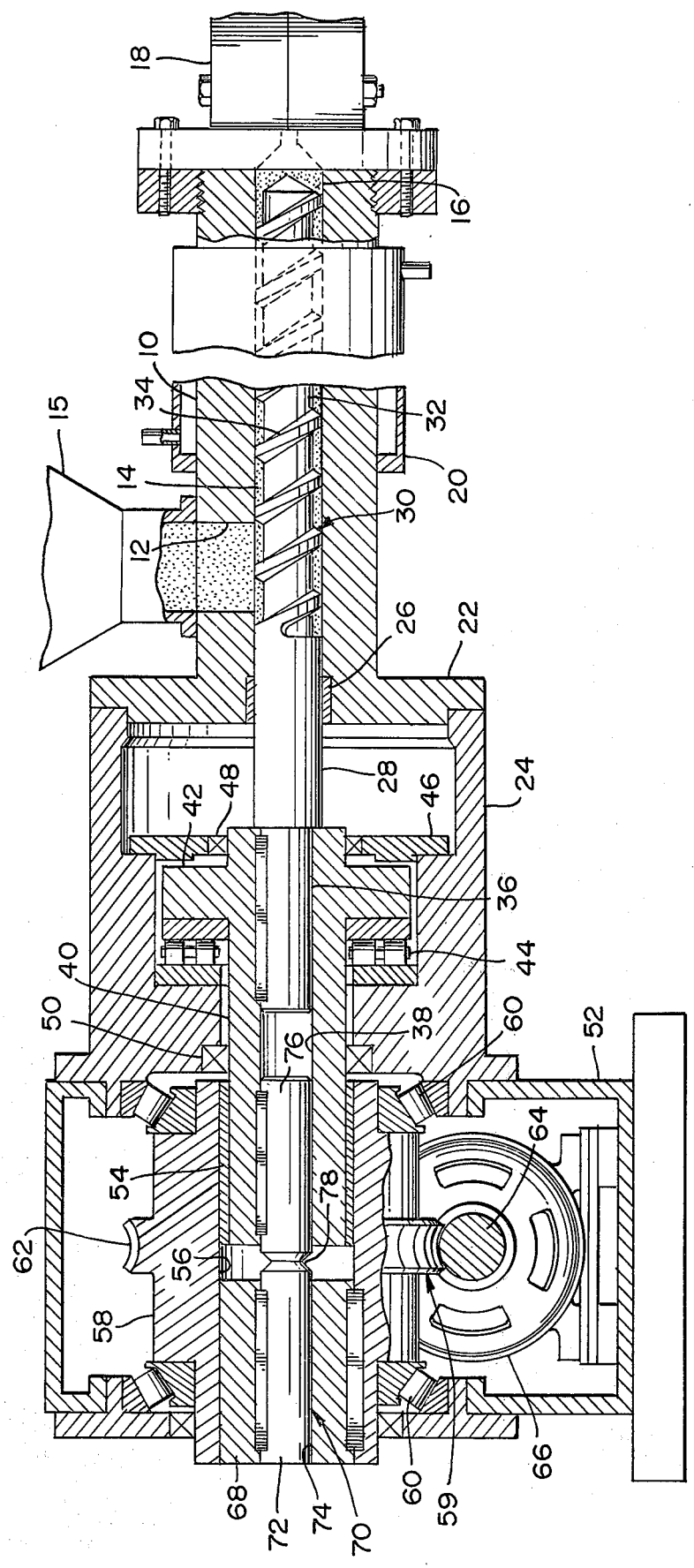
FIG. 1 is a vertical section of extruder apparatus according to the present invention.

Extruder apparatus according to the present invention is illustrated in FIG. 1 and includes an elongate hollow barrel 10 having any suitable configuration in cross-section with a radially extending inlet port 12 for receiving a plastic material 14 from a hopper 15 and an axial outlet port 16 for exit of the plastic material. A die 18 is mounted on the barrel at the outlet port 16 in order to produce an extruded product having a desired cross-sectional shape. A jacket 20 surrounds the barrel 10 and is adapted to have fluid pass therethrough in orer to control the temperature of the plastic material during the extruding process.

The barrel 10 terminates at a flange 22 mounted on a thrust housing 24, and a bushing 26 is supported in flange 22 to rotatably mount a shank 28 of an elongate screw 30 having a body 32 with a helical rib 34 extending therearound extending in the barrel from the inlet port 12 to the outlet port 16. The shank 28 has an axial extension 36 of reduced diameter splined or keyed in a central bore 38 of a driven coupling member 40 which is rotatably disposed in thrust housing 24 and has a collar 42 engaging a thrust bearing 44. A cap 46 closes the thrust housing 24 and carries an annular oil seal 48 engaging the driven coupling member 40; and, similarly, an annular oil seal 50 is disposed between the driven coupling member and the opposite end of the thrust housing.

The thrust housing 24 is mounted on a drive housing 52, and the driven coupling member 40 is received in a bronze bushing 54 within a central bore 56 of a drive output member 58 of a reducer 59, the output member 58 being rotatably mounted in the drive housing 52 by bearings 60. The reducer 59 includes a worm gear 62 secured integrally with the output member 58 and meshing with a worm 64 driven by an electric motor 66. The electric motor 66 operates at high speed and low torque, and the reducer 59 serves to reduce the speed and increase the torque at the output member 58.

A driving coupling member 68 is splined or keyed to output member 58 in bore 56 to be rotatable therewith, and an elongate shear control coupling shaft 70 has a portion 72 splined or keyed to driving coupling member 68 in a central bore 74 therein and a portion 76 splined or keyed to driven coupling member 40 in bore 38. The ends of driving coupling member 68 and driven coupling member 40 are axially spaced from each other within output member 58, and the coupling shaft 70 has a portion 78 of reduced cross-sectional area relative to portions 72 and 76 disposed in the space between driving coupling member 68 and driven coupling member 40.

In operation, the material 14 to be extruded is fed to inlet port 12, and the screw 30 is rotated in the barrel 10 via motor 66, reducer 59, coupling shaft 70 and driven coupling member 40 to force the material longitudinally through the barrel from the inlet port to the outlet port 16 where the material is forced through the die 18 to produce a product of desired cross-sectional configuration and dimensions. Various materials can be extruded with the apparatus of the present invention including, among others, polyvinylchloride, acetates, high impact polystyrene, polyethylene, polypropylene and the like; and, the pressure or torque resistance on the screw will build up in accordance with the viscosity of the material being extruded. This load on the screw will normally not remain constant but will vary with continuous extruding operation, and in view of the desire to keep the extruder apparatus in continuous operation for long periods of time, frequently twenty-four hours a day, the screw 30 must be kept rotating as the load varies without permitting the load to become sufficient to provide a shear force capable of breaking the screw.

In accordance with the present invention, the portion 78 of the coupling shaft 70 has a cross-sectional area less than the cross-sectional area at any point along the body 32 of the screw 30 such that the coupling shaft 70 will break before the screw in response to shear force. That is, with the coupling shaft 70 made of the same material as the screw 30 and the coupling shaft and the screw being directly connected between the driving torque from the output member 58 and the load created by the material 14, the coupling shaft and the screw will be subject to the same shear force and the coupling shaft will break at portion 78 before the screw will break. Once the coupling shaft 70 breaks, the drive for the screw will be interrupted such that the screw cannot be damaged.

To place the apparatus in condition for operation again, the material 14 in the barrel is loosened and the broken coupling shaft is replaced with a new coupling shaft, it being appreciated that the coupling shafts are substantially less expensive than the screws, normally on the order of 40:1 or greater and that the coupling shafts are easily replaced due to their accessibility from the drive end of the apparatus and the control of the breaking point at the portion of reduced cross sectional area. Preferably, a supply of coupling shafts is maintained in stock such that the down-time of the apparatus is reduced to a minimum, and the low cost of the coupling shafts together with the small size thereof reduce any burden of maintaining a reserve supply of the coupling shafts.

Figure 2:
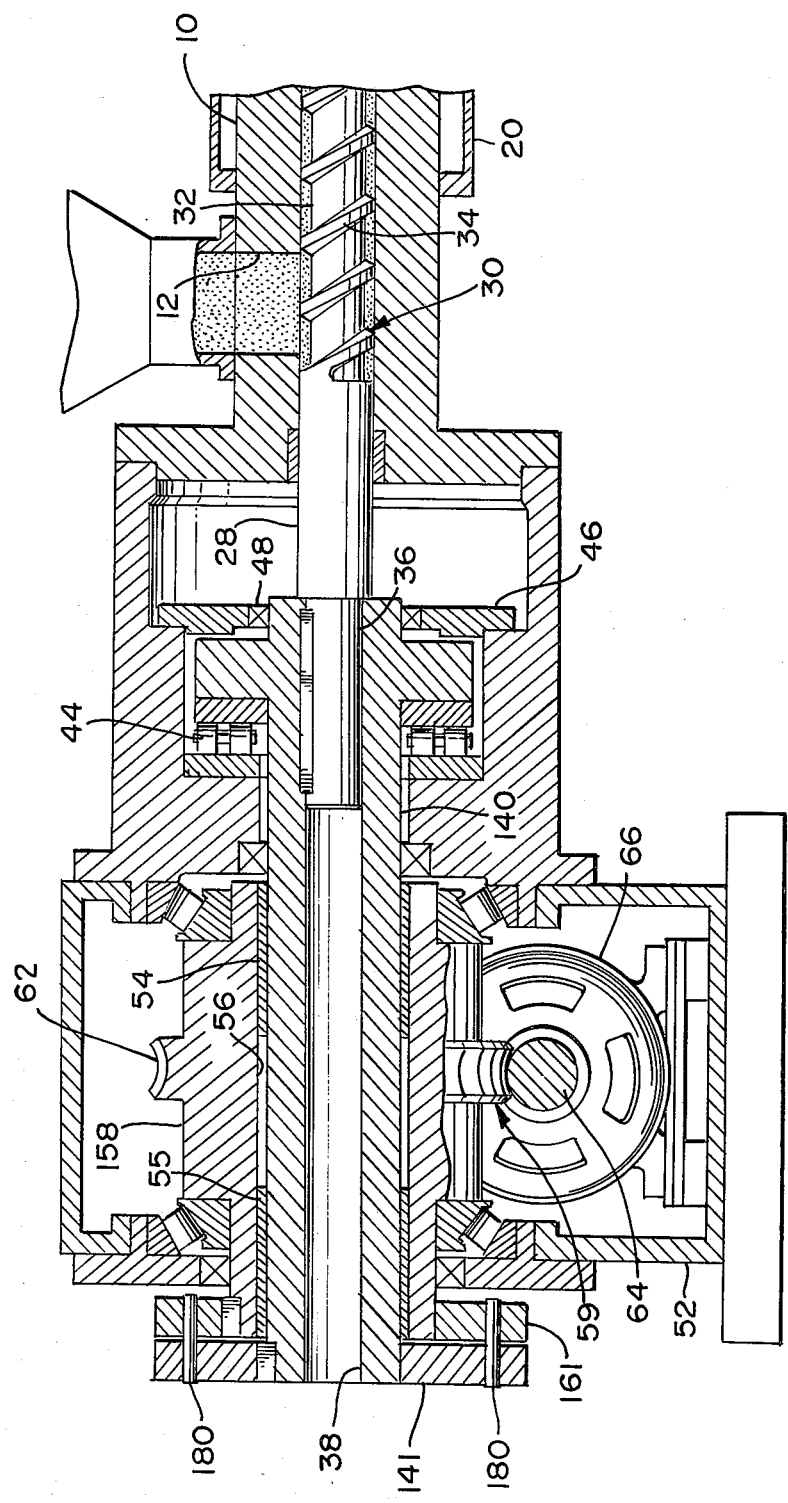
FIG. 2 is a vertical section of another embodiment of extruder apparatus according to the present invention.

Another embodiment of extruder apparatus according to the present invention is illustrated in FIG. 2 wherein parts identical to parts of FIG. 1 are given identical reference numbers and are not described again and parts similar to parts of FIG. 1 are given the same reference numbers with 100 added.

The reducer 59 of the extruder apparatus of FIG. 2 includes a drive output member 158 having a flange 161 external of drive housing 52, and a driven coupling member 140 extends through the bore 56 in the output member in bushings 54 and 55 to terminate externally of the drive housing at a flange 141. The flanges of the output member 158 and the driven coupling member 140 are connected by shear pins 180 such that the screw 30 is rotationally driven by motor 66 via worm 64, worm gear 66, output member 158 and driven coupling 140.

The operation of the extruder apparatus of FIG. 2 is similar to the operation of the extruder apparatus of FIG. 1 with the exception that the shear pins 180 are designed to break under a predetermined shear force less than the shear force required to break the screw to interrupt drive to the screw before the screw can be damaged. In order to return the extruder apparatus to operating condition after the predetermined shear force has been exceeded, new shear pins need only be inserted for the broken shear pins such that drive is reestablished between the output member 158 and the driven coupling 140.

Of course, any desired conventional shear control device could be coupled with the flanges 141 and 159 to provide control of the extruder apparatus to interrupt drive to the screw in response to a predetermined shear force, such devices including overload clutches and couplings, torque limiters, current limiters, overload switches and the like. The use of shear pins 180 is preferred, however, in that the shear control cannot malfunction to permit damage to the screw since the shear pins are required for drive whereas with shear control devices which operate by deenergizing the motor 66, the screw can be damaged or broken should the shear control device or the motor control malfunction.

In both embodiments of the present invention, the shear control device is responsive to the shear force at the low speed, high torque drive output member of the reducer such that manufacturing tolerances are not amplified by the reducer thereby increasing dependability of the apparatus. The extruder apparatus of FIG. 1 has the advantage that precision direct shear control is provided without fear of malfunction while the predetermined shear force at which drive should be interrupted can be varied by substituting shear control coupling shafts having varying portions of reduced cross-sectional area or constructed of different materials. Furthermore, once the shear control coupling shaft is installed in the extruder apparatus, the operator cannot vary the shear force limit without substituting a different coupling shaft therefor such that reliable operation is assured independent of human error. The portion 78 of the coupling shaft 70 can have any desired configuration with the simplest manner of reducing the cross sectional area being to reduce the diameter by cutting or in any other manner. The reduced cross section portion 78 is desirable in order to control the breaking point of the coupling shaft and, therefore, prevent damage to the other drive parts while facilitating replacement of the coupling shaft. When the screw is made of a stronger material than the coupling shaft, the cross sectional area of the coupling shaft can be greater than that of the screw while still assuring that the coupling shaft will break before the screw.

While the present invention has been described as used with extruder apparatus of particular structure, the present invention can be used with any screw-type extruder apparatus having any desired temperature control means, any vertical or horizontal orientation either front or rear end drive, any seal any bearing structure and any type or reducer with any desired input/output ratio, of particular advantage being gear reducers in that the reducer ratio can be easily changed by substituting gear. For instance the driven coupling member can be deleted from the apparatus, if desired, and the drive supplied directly to the shank of the screw.

Inasmuch as the present invention is subject to many variations, modifications and changes in detail, it is intended that all matter described above or shown in the accompanying drawings be interpreted as illustrative and not in a limiting sense.

What is claimed is:
1. Apparatus for extruding plastic material comprising
barrel means having inlet means for receiving material to be extruded and outlet means for exit of the material;
screw means disposed in said barrel means and including an elongate body extending longitudinally in said barrel means and a helical rib extending around said body;
drive means including motor means and reducer means coupled with and rotatably driven by said motor means and having output means driven at a speed less than the speed of said motor means; and
shear control means coupling said output means of said reducer means with said screw means to rotate said screw means to force the material to be extruded from said inlet means to said outlet means of said barrel, said shear control means including a coupling shaft having a portion of reduced cross-sectional area to control the breaking point of said coupling shaft, said portion of reduced cross-sectional area of said coupling shaft having a cross-sectional area less than the cross-sectional area of said body of said screw means such that said coupling shaft will break at said portion of reduced cross-sectional area to interrupt rotation of said screw means when the shear force between said screw means and said output means of said reducer means exceeds a predetermined value less than the shear force required to break said screw means.

2. Apparatus for extruding materials as recited in claim 1 wherein the cross-sectional area of said portion of reduced cross-sectional area of said coupling shaft is less than the cross-sectional area at any point along said screw means.

3. Apparatus for extruding materials as recited in claim 1, wherein said output means of said reducer means includes a driving coupling member and said drive means includes a driven coupling member engaging said screw means, and said coupling shaft of said shear control means couples said driving coupling member and said driven coupling member.

4. Apparatus for extruding materials as recited in claim 1, wherein said shear control means includes a coupling shaft made of the same material as said screw means.

5. Apparatus for extruding materials as recited in claim 1, wherein said shear control means includes a coupling shaft made of a different material than said screw means.

6. Apparatus for extruding material comprising
barrel means having inlet means for receiving material to be extruded and outlet means for exit of the material;
screw means disposed in said barrel means including a shank and an elongate body extending longitudinally in said barrel means and having a helical rib therearound;
drive means including motor means, reducer means coupled with and rotatably driven by said motor means and having output means driven at a speed less than the speed of said motor means, and a driven coupling member engaging said shank of said screw means; and
shear control means coupling said output means of said reducer means with said driven coupling member to rotate said screw means to force the material to be extruded from said inlet means to said outlet means of said barrel said shear control means including a coupling shaft engaging said driven coupling member and said output means of said reducer means and having a portion of reduced cross-sectional area with the cross-sectional area thereof being less than the cross-sectional area of said body of said screw means such that said coupling shaft will break at said portion of reduced cross-sectional area to interrupt rotation of said screw means when the shear force between said screw means and said output means of said reducer means exceeds a predetermined value less than the shear force required to break said screw means.

7. Apparatus for extruding materials as recited in claim 6, wherein said output means of said reducer means includes a drive output member and a driving coupling member axially spaced from said driven coupling member engaging said drive output member, and said coupling shaft has a portion engaging said driving coupling member and a portion engaging said driven coupling member, said portion of reduced cross-sectional area being disposed in the space between said driving coupling member and said driven coupling member.

8. Apparatus for extruding material comprising barrel means having inlet means for receiving material to be extruded and outlet means for exit of the material;

screw means disposed in said barrel means;

drive means including motor means, reducer means coupled with and rotatably driven by said motor means and having output means driven at a speed less than the speed of said motor means, a driven coupling member engaging said screw means, a housing, and bearing means rotatably mounting said output means of said reducer means in said housing, said driven coupling member extending through said output means of said reducer means and terminating at a flange external of said housing, said output means of said reducer means having a flange disposed externally of said housing between said driven coupling member flange and said housing; and shear control means coupling said output means of said reducer means with said driven coupling member to rotate said screw means to force the material to be extruded from said inlet means to said outlet means of said barrel, said shear control means including shear pins engaging said flange of said output means and said driven coupling member flange such that said shear pins will break to interrupt rotation of said screw means when the shear force between said screw means and said output means of said reducer means exceeds a predetermined value less than the shear force required to break said screw means.

9. Apparatus for extruding material comprising barrel means having inlet means for receiving material to be extruded and outlet means for exit of the material;

screw means disposed in said barrel means;

drive means including motor means, reducer means coupled with and rotatably driven by said motor means and having output means driven at a speed less than the speed of said motor means, a driven coupling member engaging said screw means, a housing, and bearing means rotatably mounting said output means of said reducer means in said housing, said driven coupling member extending through said output means of said reducer means and terminating at a flange external of said housing, said output means of said reducer means having a flange disposed externally of said housing between said driven coupling member flange and said housing; and shear control means coupling said output means of said reducer means with said driven coupling member to rotate said screw means to force the material to be extruded from said inlet means to said outlet means of said barrel, said shear control means coupling said flange of said output means and said driven coupling member flange being operative to interrupt rotation of said screw means when the shear force between said screw means and said output means of said output means of said reducer means exceeds a predetermined value less than the shear force required to break said screw means.

\* \* \* \* \*